United States Patent
Ferman

(10) Patent No.: US 8,620,080 B2
(45) Date of Patent: Dec. 31, 2013

(54) METHODS AND SYSTEMS FOR LOCATING TEXT IN A DIGITAL IMAGE

(75) Inventor: Ahmet Mufit Ferman, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1177 days.

(21) Appl. No.: 12/239,685

(22) Filed: Sep. 26, 2008

(65) Prior Publication Data
US 2010/0080461 A1    Apr. 1, 2010

(51) Int. Cl.
*G06K 9/34*    (2006.01)

(52) U.S. Cl.
USPC .............................. 382/176; 382/173; 382/180

(58) Field of Classification Search
None
See application file for complete search history.

(56) References Cited

U.S. PATENT DOCUMENTS

| | | | |
|---|---|---|---|
| 4,527,283 A | 7/1985 | Ito et al. | |
| 4,926,490 A | 5/1990 | Mano | |
| 4,953,230 A | 8/1990 | Kurose | |
| 5,001,766 A | 3/1991 | Baird | |
| 5,033,104 A * | 7/1991 | Amano | 382/177 |
| 5,060,276 A | 10/1991 | Morris et al. | |
| 5,062,141 A | 10/1991 | Nakayama et al. | |
| 5,093,868 A * | 3/1992 | Tanaka et al. | 382/177 |
| 5,191,438 A | 3/1993 | Katsurada et al. | |
| 5,199,084 A | 3/1993 | Kishi et al. | |
| 5,278,918 A | 1/1994 | Bernzott et al. | |
| 5,384,864 A | 1/1995 | Spitz | |
| 5,410,611 A | 4/1995 | Huttenlocher et al. | |
| 5,452,374 A | 9/1995 | Cullen et al. | |
| 5,537,490 A | 7/1996 | Yukawa | |
| 5,563,403 A | 10/1996 | Bessho et al. | |
| 5,581,633 A * | 12/1996 | Hotta et al. | 382/171 |
| 5,588,072 A | 12/1996 | Wang | |
| 5,594,817 A | 1/1997 | Fast et al. | |
| 5,613,016 A | 3/1997 | Saitoh | |
| 5,619,594 A * | 4/1997 | Melen | 382/233 |
| 5,680,479 A | 10/1997 | Wang et al. | |
| 5,717,794 A | 2/1998 | Koga et al. | |
| 5,737,437 A * | 4/1998 | Nakao et al. | 382/101 |
| 5,761,344 A | 6/1998 | Al-Hussein | |
| 5,818,978 A | 10/1998 | Al-Hussein | |
| 5,854,853 A | 12/1998 | Wang | |
| 5,854,854 A | 12/1998 | Cullen et al. | |
| 5,892,843 A | 4/1999 | Zhou et al. | |
| 5,949,906 A | 9/1999 | Hontani et al. | |

(Continued)

FOREIGN PATENT DOCUMENTS

| | | |
|---|---|---|
| EP | 0 811 946 A2 | 12/1997 |
| EP | 0 811 946 A3 | 1/1998 |

(Continued)

*Primary Examiner* — Li Liu
(74) *Attorney, Agent, or Firm* — Kristine Elizabeth Matthews; David C. Ripma

(57) ABSTRACT

Aspects of the present invention relate to systems and methods for locating text in a digital image. According to a first aspect of the present invention, a multi-stage filtering technique may be used to progressively refine a set of candidate text components associated with a digital image. A first, refined set of candidate text components may be formed by filtering an initial set of candidate text components based on component properties. Text lines may reconstructed from the first, refined set of candidate text components. The first, refined set of candidate text components may be further filtered based on text-line properties measured on the reconstructed text lines.

20 Claims, 11 Drawing Sheets

(56) References Cited

U.S. PATENT DOCUMENTS

| | | |
|---|---|---|
| 5,987,171 A | 11/1999 | Wang |
| 6,035,061 A * | 3/2000 | Katsuyama et al. .......... 382/177 |
| 6,035,064 A | 3/2000 | Nakao et al. |
| 6,104,832 A | 8/2000 | Saito et al. |
| 6,249,604 B1 | 6/2001 | Huttenlocher et al. |
| 6,332,046 B1 | 12/2001 | Fujimoto et al. |
| 6,577,763 B2 | 6/2003 | Fujimoto et al. |
| 7,016,536 B1 | 3/2006 | Ling et al. |
| 8,023,741 B2 * | 9/2011 | Ferman et al. ................ 382/182 |
| 2002/0141641 A1 * | 10/2002 | Zhu ............................... 382/170 |
| 2003/0156754 A1 * | 8/2003 | Ouchi ........................... 382/176 |
| 2005/0201619 A1 * | 9/2005 | Sun et al. ...................... 382/176 |
| 2007/0110322 A1 * | 5/2007 | Yuille et al. ................... 382/227 |
| 2007/0116360 A1 * | 5/2007 | Jung et al. .................... 382/176 |
| 2008/0002893 A1 * | 1/2008 | Vincent et al. ................ 382/229 |

FOREIGN PATENT DOCUMENTS

| | | |
|---|---|---|
| EP | 1 061 469 A1 | 12/2000 |
| EP | 1 061 469 B1 | 7/2003 |
| JP | 2008217833 A | 9/2008 |

\* cited by examiner

METHODS AND SYSTEMS FOR LOCATING TEXT IN A DIGITAL IMAGE

FIELD OF THE INVENTION

Embodiments of the present invention relate to the field of image analysis, and more particularly, to locating text characters in a digital image.

BACKGROUND

A document image may contain a variety of content, for example, text, line art and pictures. Exemplary line art may comprise graphics, figures and other types of line art, and pictorial content may comprise either a continuous-tone picture or a half-tone picture. Additionally, a document image may comprise local and page color background regions, text characters with various sizes, colors and fonts and tabulated data.

The content of a digital image may have considerable impact on the compression of the digital image, both in terms of compression efficiency and compression artifacts. Pictorial regions in an image may not be efficiently compressed using compression algorithms designed for the compression of text. Similarly, text images may not be efficiently compressed using compression algorithms that are designed and optimized for pictorial content. Not only may compression efficiency be affected when a compression algorithm designed for one type of image content is used on a different type of image content, but the decoded image may exhibit visible compression artifacts.

Additionally, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

Copiers, scanners and other imaging devices may use text segmentation when performing content-specific processing and compression on document, and other digital, images. Exemplary content-specific processing may comprise differential filtering and color enhancement. Exemplary content-specific compression may comprise layered compression schemes, where the contents of a document image are segmented into a high-resolution foreground layer and a lower resolution background.

Detection of text in digital images may be used so that content-type-specific image enhancement methods may be applied to the appropriate regions in a digital image. The detection of regions of a particular content type in a digital image may improve compression efficiency, reduce compression artifacts, and improve image quality when used in conjunction with a compression algorithm or image enhancement algorithm designed for the particular type of content. Additionally, text detection may be performed prior to optical character recognition (OCR) and other image analysis tasks.

Robust text detection techniques that are able to reject non-text content while retaining actual text components may be desirable.

SUMMARY

Embodiments of the present invention comprise methods and systems for detecting text in a digital image.

Some embodiments of the present invention comprise a multi-stage filtering technique which may be employed to progressively refine a set of candidate text components associated with a digital image. An initial set of candidate text components may be received and initially filtered based on component properties, thereby producing a first refined set of candidate text components. Text lines may be reconstructed from the first refined set of candidate text components, and the first refined set of candidate text components may be further filtered based on text-line properties measured on the reconstructed text lines.

Alternative embodiments of the present invention comprise parallel component-properties-based filtering and/or text-line-properties-based filtering.

The foregoing and other objectives, features, and advantages of the invention will be more readily understood upon consideration of the following detailed description of embodiments of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
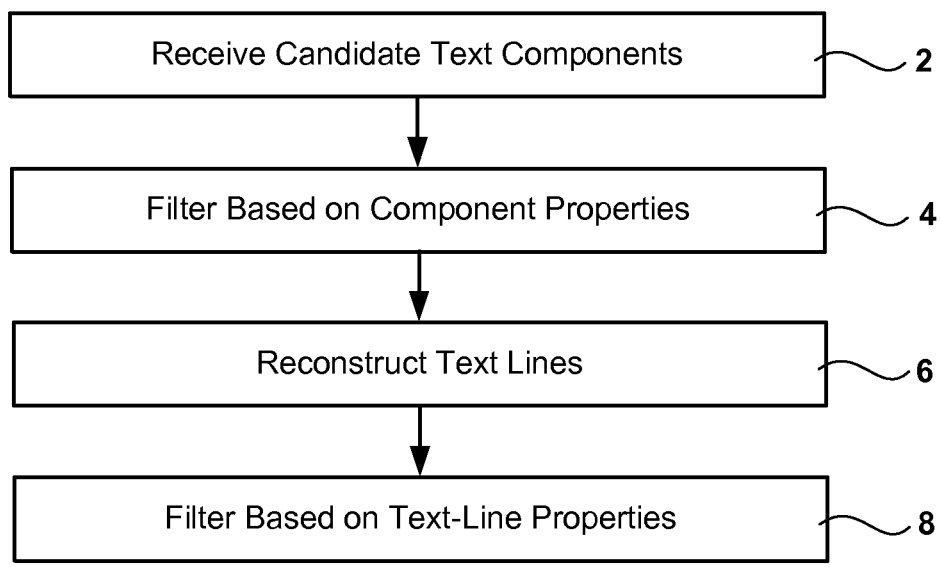
FIG. 1 is a chart showing exemplary embodiments of the present invention comprising multi-stage filtering, wherein candidate text components may be progressively refined.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

A document image may contain a variety of content, for example, text, line art and pictures. Exemplary line art may comprise graphics, figures and other types of line art, and pictorial content may comprise either a continuous-tone picture or a half-tone picture. Additionally, a document image may comprise local and page color background regions, text characters with various sizes, colors and fonts and tabulated data.

The content of a digital image may have considerable impact on the compression of the digital image, both in terms of compression efficiency and compression artifacts. Pictorial regions in an image may not be efficiently compressed using compression algorithms designed for the compression of text. Similarly, text images may not be efficiently compressed using compression algorithms that are designed and optimized for pictorial content. Not only may compression efficiency be affected when a compression algorithm designed for one type of image content is used on a different type of image content, but the decoded image may exhibit visible compression artifacts.

Additionally, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

Copiers, scanners and other imaging devices may use text segmentation when performing content-specific processing and compression on document, and other digital, images. Exemplary content-specific processing may comprise differential filtering and color enhancement. Exemplary content-specific compression may comprise layered compression schemes, where the contents of a document image are segmented into a high-resolution foreground layer and a lower resolution background.

Detection of text in digital images may be used so that content-type-specific image enhancement methods may be applied to the appropriate regions in a digital image. The detection of regions of a particular content type in a digital image may improve compression efficiency, reduce compression artifacts, and improve image quality when used in conjunction with a compression algorithm or image enhancement algorithm designed for the particular type of content. Additionally, text detection may be performed prior to optical character recognition (OCR) and other image analysis tasks.

Robust text detection techniques that are able to reject non-text content while retaining actual text components may be desirable.

Some embodiments of the present invention may be described in relation to FIG. 1. In these embodiments, a multi-stage filtering technique may be employed to progressively refine a set of candidate text components associated with a digital image. An initial set of candidate text components may be received 2 and initially filtered 4 based on component properties, thereby producing a first refined set of candidate text components. Text lines may be reconstructed 6 from the first refined set of candidate text components, and the first refined set of candidate text components may be further filtered 8 based on text-line properties measured on the reconstructed text lines.

An input digital image may be pre-processed and conditioned for analysis by embodiments of the present invention. The outcome of the pre-processing may be a set of connected components that may correspond to non-background content in the input digital image. Exemplary non-background content may comprise text, pictures, line art, local background regions and other non-background regions. A person having ordinary skill in the art will recognize there are many methods for determining connected components in a digital image. Typically an input image may be processed according to a binarization process that may be followed by a connected-component labeling process, wherein individual pixels that are connected through common neighbors may be grouped into single entities. Each connected component may be represented by a minimum bounding box that contains all of the non-background pixels.

Embodiments of the present invention described in relation to FIG. 1 may receive 2 candidate text components. It may be appreciated that the candidate text components may be represented in many forms and/or structures. Exemplary forms and/or structures for the candidate text components may comprise a list of bounding boxes, wherein each bounding box in the list corresponds to a connected component representing a non-background image component, an image map, wherein each pixel may have an associated label, wherein the label may associate a pixel with an indexed component or the background, and other forms and structures for representing connected components.

Figure 2:
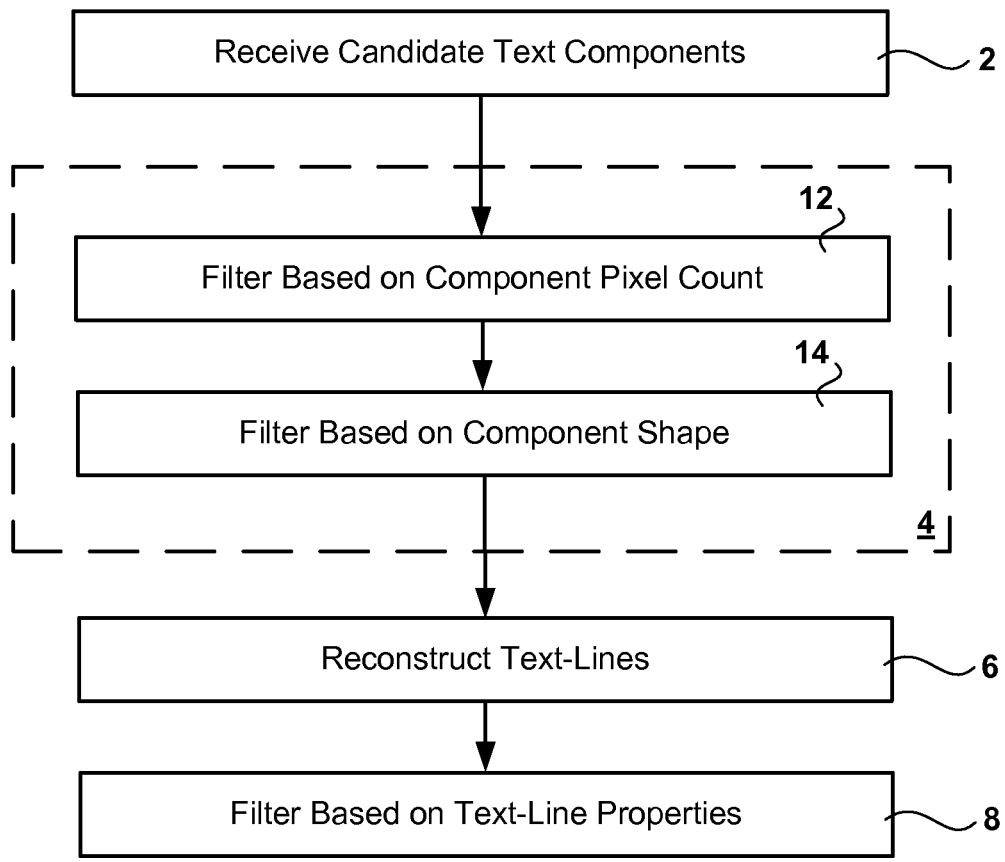
FIG. 2 is a chart showing exemplary embodiments of the present invention comprising component-pixel-count-based filtering and component-shape-based filtering.

In some embodiments of the present invention described in relation to FIG. 2, component-properties-based filtering 2 may comprise filtering 12 based on component pixel count and filtering 14 based on component shape-related properties. Text-line reconstruction 6 and filtering 8 based on text-line properties may follow using the refined set of candidate components generated from the component-pixel-count-based filtering 12 and the component-shape-based filtering 14 of the initially received 2 candidate text components.

In some embodiments of the present invention, filtering 12 based on component pixel count, may comprise eliminating a candidate component from further consideration when the number of pixels comprising a component does not fall within a predetermined range. An exemplary embodiment may comprise eliminating a candidate component when $C_{pcount}^i$<cnt_min or $C_{pcount}^i$>cnt_max, where $C_{pcount}^i$ is the number of pixels comprising the ith candidate component and [cnt_min, cnt_max] is the range of pixel counts for which candidate components may be retained. In this stage of filtering, candidates comprising isolated noise pixels, as well as those comprising large regions which are unlikely to be text may be eliminated. Exemplary large connected components which are unlikely to be text include local background regions, pictorial regions and other large non-text regions.

In some embodiments of the present invention, the upper and lower bounds, cnt_max and cnt_min, respectively, may be heuristically or empirically established. In alternative embodiments of the present invention, these bounds may be dynamically determined and based on properties of the input image from which the initial set of candidate components may be determined. Exemplary input image properties may comprise, size, resolution and other image properties.

In some embodiments of the present invention, filtering 14 based on component shape may comprise determining the values of several shape properties for a candidate component. In some embodiments of the present invention, the component width may be determined, and the width of the ith component may be denoted $C_{width}^i$. In some embodiments, wherein the candidate text components may be received 2 as bounding boxes, the component width may correspond to the width of the component bounding box. In alternative embodiments, wherein the candidate text components may be received 2 as a component map, the component width may be calculated directly using the map. In some embodiments of the present invention, the component height may be determined, and the height of the ith component may be denoted $C_{height}^i$. In some embodiments, wherein the candidate text components may be received 2 as bounding boxes, the component height may correspond to the height of the component bounding box. In alternative embodiments, wherein the candidate text components may be received 2 as a component map, the component height may be calculated directly using the map. In some embodiments of the present invention, the aspect ratio associated with a component may be determined according to:

$$C_{AR}^i = \frac{\max(C_{width}^i, C_{height}^i)}{\min(C_{width}^i, C_{height}^i)},$$

where $C_{AR}^i$ denotes the aspect ratio of the ith component.

In some embodiments of the present invention, the component-shape-based filtering 14 may comprise labeling the ith component, $C^i$, as a text component or a non-text component according to:

$$\text{label}(C^i) = \begin{cases} \text{text}, & (Condition_{width} \mid Condition_{height}) \& (Condition_{AR}) \\ \text{non-text}, & \text{otherwise} \end{cases},$$

where $Condaton_{width}$, $Condition_{height}$ and $Condition_{AR}$ are conditions on the width, height and aspect ratio of the ith component, respectively, and & and I denote the logical "and" operations and the logical "or" operation, respectively. In some embodiments of the present invention, the three conditions $Condition_{width}$, $Condition_{height}$ and $Condition_{AR}$ may be found according to:

$$Condition_{width}=(C_{width}^i>T_{width}^{min})\&(C_{width}^i<T_{width}^{max}),$$

$$Condition_{height}=(C_{height}^i>T_{height}^{min})\&(C_{height}^i<T_{height}^{max})$$

and $$Condition_{AR}=(C_{AR}^i>T_{AR}^{min})\&(C_{AR}^i<T_{AR}^{max}),$$

respectively, where $T_{width}^{min}$, $T_{width}^{max}$ are the upper and lower bounds on acceptable component widths, respectively, $T_{height}^{min}$, $T_{height}^{max}$ the upper and lower bounds on acceptable component heights, respectively, and $T_{AR}^{min}$, $T_{AR}^{max}$ are the upper and lower bounds on acceptable component aspect ratios, respectively.

In alternative embodiments of the present invention, the component-shape-based filtering 14 may comprise labeling the ith component, $C^i$, as a text component or a non-text component according to:

$$\text{label}(C^i) = \begin{cases} \text{text}, & Condition_{width} \& Condition_{height} \& Condition_{AR} \\ \text{non-text}, & \text{otherwise} \end{cases},$$

where $Condition_{width}$, $Condition_{height}$ and $Condition_{AR}$ are conditions on the width, height and aspect ratio of the ith component, respectively, and & denotes the logical "and" operation. In some embodiments of the present invention, the three conditions $Condition_{width}$, $Condition_{height}$ and $Condition_{AR}$ may be found according to:

$$Condition_{width}=(C_{width}^i>T_{width}^{min})\&(C_{width}^i<T_{width}^{max}),$$

$$Condition_{height}=(C_{height}^i>T_{height}^{min})\&(C_{height}^i<T_{height}^{max})$$

and $$Condition_{AR}=(C_{AR}^i>T_{AR}^{min})\&(C_{AR}^i<T_{AR}^{max}),$$

respectively, where $T_{width}^{min}$, $T_{width}^{max}$ are the upper and lower bounds on acceptable component widths, respectively, $T_{height}^{min}$, $T_{height}^{max}$ are the upper and lower bounds on acceptable component heights, respectively, and $T_{AR}^{min}$, $T_{AR}^{max}$ are the upper and lower bounds on acceptable component aspect ratios, respectively.

In some embodiments of the present invention, the thresholds, $T_{width}^{min}$, $T_{width}^{max}$, $T_{height}^{min}$, $T_{height}^{max}$, $T_{AR}^{min}$ and $T_{AR}^{max}$, may be heuristically or empirically established. In alternative embodiments of the present invention, these thresholds may be dynamically determined and based on properties of the input image from which the initial set of candidate components may be determined. Exemplary input image properties may comprise, size, resolution and other image properties. In an exemplary alternative embodiment of the present invention, the width and height thresholds, $T_{width}^{min}$, $T_{width}^{max}$, $T_{height}^{min}$ and $T_{height}^{max}$, may be determined according to:

$$T_{width}^{min}=\lfloor \omega_1 \mu_{width} \rfloor,$$

$$T_{width}^{max}=\lceil \omega_2 \mu_{width} \rceil,$$

$$T_{height}^{min}=\lfloor \omega_3 \mu_{height} \rfloor$$

and $$T_{height}^{max}=\lceil \omega_4 \mu_{height} \rceil,$$

where $\lfloor \bullet \rfloor$ and $\lceil \bullet \rceil$ denote the "floor" and "ceiling" operations, respectively, and $\mu_{width}$ and $\mu_{height}$ denote the mean values of the widths and heights of the candidate components, respectively, and $\omega_j$, $j=1, \ldots, 4$ denote weights used to compute the thresholds. In some embodiments of the present invention the weights may be selected according to:

$$\omega_1 \leq 1,$$

$$\omega_3 \leq 1,$$

$$\omega_2 \geq 1$$

and $$\omega_4 \geq 1.$$

In some embodiments of the present invention, the weights may be selected such that $\omega_1=\omega_3$ and $\omega_2=\omega_4$.

In alternative embodiments of the present invention, the width and height thresholds, $T_{width}^{min}$, $T_{width}^{max}$, $T_{height}^{min}$ and $T_{height}^{max}$, may be determined according to:

$$T_{width}^{min}=\lfloor \omega_1 \mu_{width} \rfloor,$$

$$T_{width}^{max}=\lceil \omega_2 \mu_{width} \rceil,$$

$$T_{height}^{min}=\lfloor \omega_3 \mu_{height} \rfloor$$

and $$T_{height}^{max}=\lceil \omega_4 \mu_{height} \rceil,$$

where $\mu_{width}$ and $\mu_{height}$ denote a statistical parameter with respect to the width and height of the candidate components, respectively. Exemplary statistical parameters may include a trimmed mean, media, mode and other statistical parameters.

In some embodiments of the present invention, inter-component properties may be used to eliminate non-text candidate components retained by the component-properties-based filtering 4. Candidate components remaining after component-properties-based filtering 4 may be combined 6 to form text lines. Text lines may be generated using any of the methods available in the art. An exemplary method is described in U.S. Pat. No. 5,949,906, entitled "Apparatus and method for extracting character string."

Text line reconstruction 6 may yield K candidate text lines which may be denoted $L_k$, k=1, . . . , K, and a candidate text line may comprise one or more candidate connected components which may be denoted $C_k^i$ where k indicates the candidate text line containing candidate component i.

Figure 3:
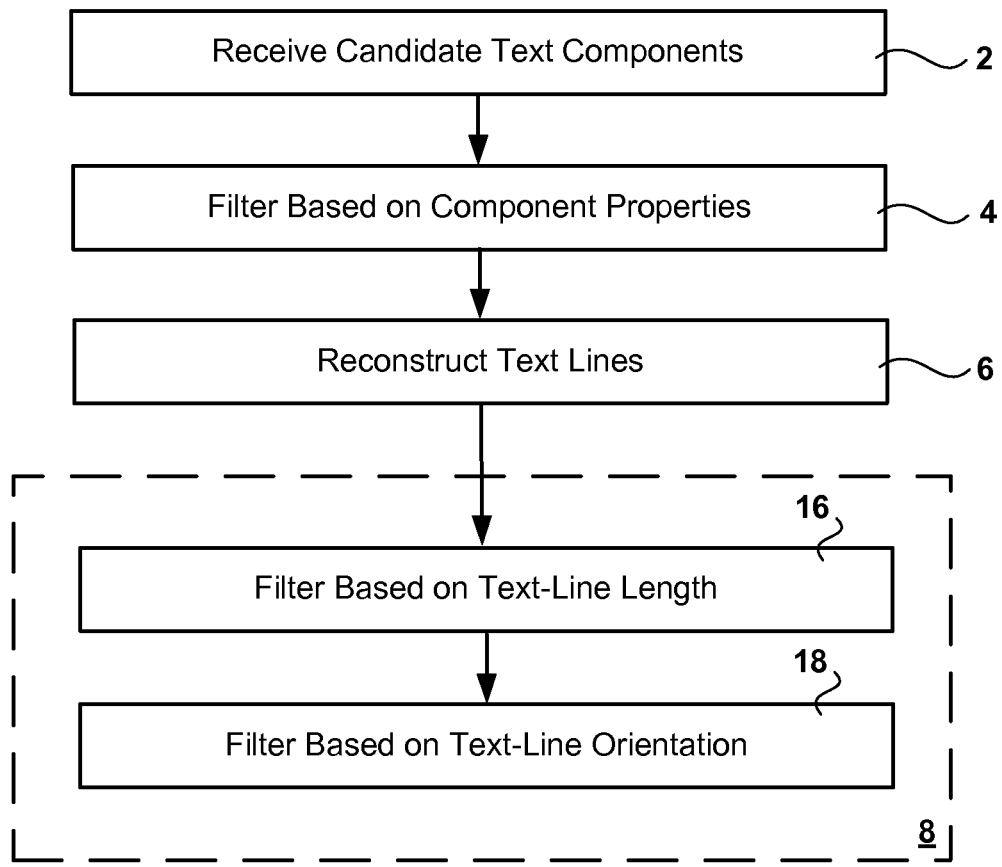
FIG. 3 is a chart showing exemplary embodiments of the present invention comprising text-line-length-based filtering and text-line-orientation-based filtering.

In some embodiments of the present invention described in relation to FIG. 3, text-line-property-based filtering 8 may comprise filtering 16 based on text-line length and filtering 18 based on text-line orientation. Candidate components retained by filtering 4 based on component size may be eliminated based on text-line-property-based filtering 8.

Text characters typically occur as part of text lines and almost never in isolation. In some embodiments of the present invention, isolated candidate components may be eliminated as text components as a result of text-line-length-based filtering 16. In these embodiments of the present invention, the candidate components $C_k^i$ contained in text line $L_k$ may be eliminated as text components according to:

$$\text{label}(C_k^i) = \begin{cases} \text{text,} & \text{length } (L_k) \geq T_{line\_length} \\ \text{non-text,} & \text{otherwise} \end{cases},$$

where length $(L_k)$ is the number of components $C_k^i$ in text line $L_k$ and $T_{line\_length}$ is a fixed threshold. In some embodiments of the present invention $T_{line\_length}$ may be heuristically or empirically established. In alternative embodiments of the present invention, the threshold $T_{line\_length}$ may be dynamically determined and based on properties of the document language and/or line reconstruction technique. In some embodiments of the present invention, the value of $T_{line\_length}$ may be in the range of 8 to 12.

Figure 4:
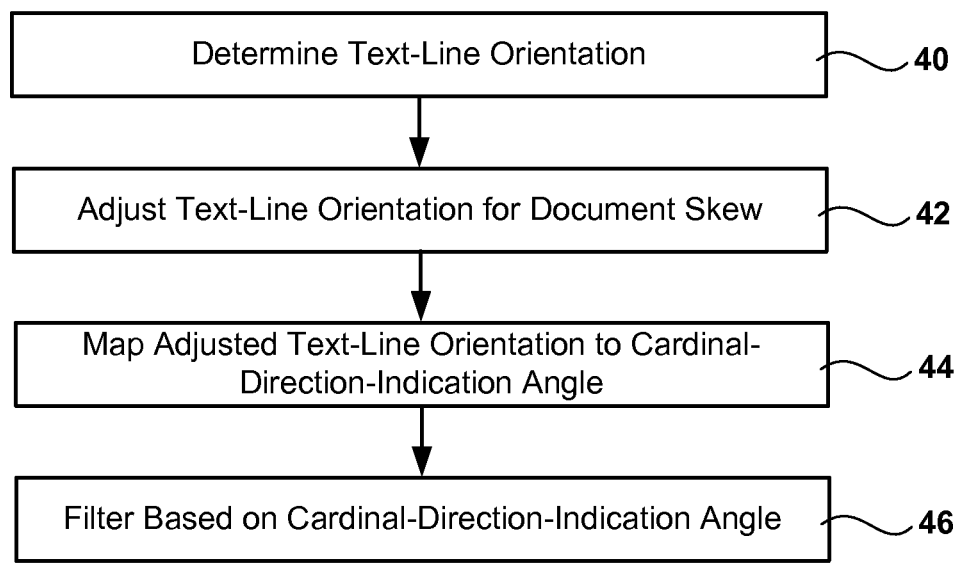
FIG. 4 is a chart showing exemplary embodiments of the present invention comprising text-line orientation determination.

Text lines retained by text-line-length-based filtering 16 may be further filtered 18 based on text-line orientation. In an overwhelming majority of document images, text may be oriented horizontally and/or vertically with respect to page boundaries, depending on the language in which the document is written. In some embodiments of the present invention, reconstructed text lines with an orientation not in either of these cardinal orientations may be eliminated as comprising text components. Some of these embodiments of the present invention may be described in relation to FIG. 4.

In these embodiments, the orientation of a text line, $L_k$, may be determined 40 and may be denoted $\theta_k$, where $\theta_k$ is the angle between the text line and the scanner axes. The orientation $\theta_k$ associated with text line $L_k$ may be adjusted 42 for the skew angle inherent in the input image according to:

$$\theta_k' = \theta_k - \theta_{doc},$$

where $\theta_k'$ denotes the adjusted orientation angle and $\theta_{doc}$ denotes the document skew angle. In some embodiments of the present invention, the orientation angle associated with a text line may be determined 40 by calculating the slope of the line through the centroid of the first component in the text line and the centroid of the last component in the text line. In some embodiments of the present invention, the method used for determining the text lines may provide an associated orientation for each text line.

In some embodiments of the present invention, a document image may be adjusted for skew prior to processing for text determination. In these embodiments, the skew angle may be given by $\theta_{doc}=0$.

An intermediate parameter may be determined 44 which may map the adjusted text-line orientation angle $\theta_k'$ to a cardinal-direction-indication angle according to:

$$\theta_k'' = \begin{cases} \theta_k', & |\theta_k'| \leq 45° \\ 90° - \theta_k', & \text{otherwise} \end{cases},$$

where $\theta_k''$ may be close to 0° for text line orientations in either the vertical or horizontal cardinal directions. Thus, the candidate components $C_k^i$ contained in text line $L_k$ may be eliminated as text components according to:

$$\text{label}(C_k^i) = \begin{cases} \text{text,} & \theta_k'' \leq T_\theta \\ \text{non-text,} & \text{otherwise} \end{cases},$$

where $T_\theta$ is a predetermined threshold. In some embodiments of the present invention, $T_\theta$ may be set to 0° for strict enforcement of the orientation criterion. In alternative embodiments of the present invention, $T_\theta$ may be set to a non-zero value to compensate for errors in skew computation.

Figure 5:
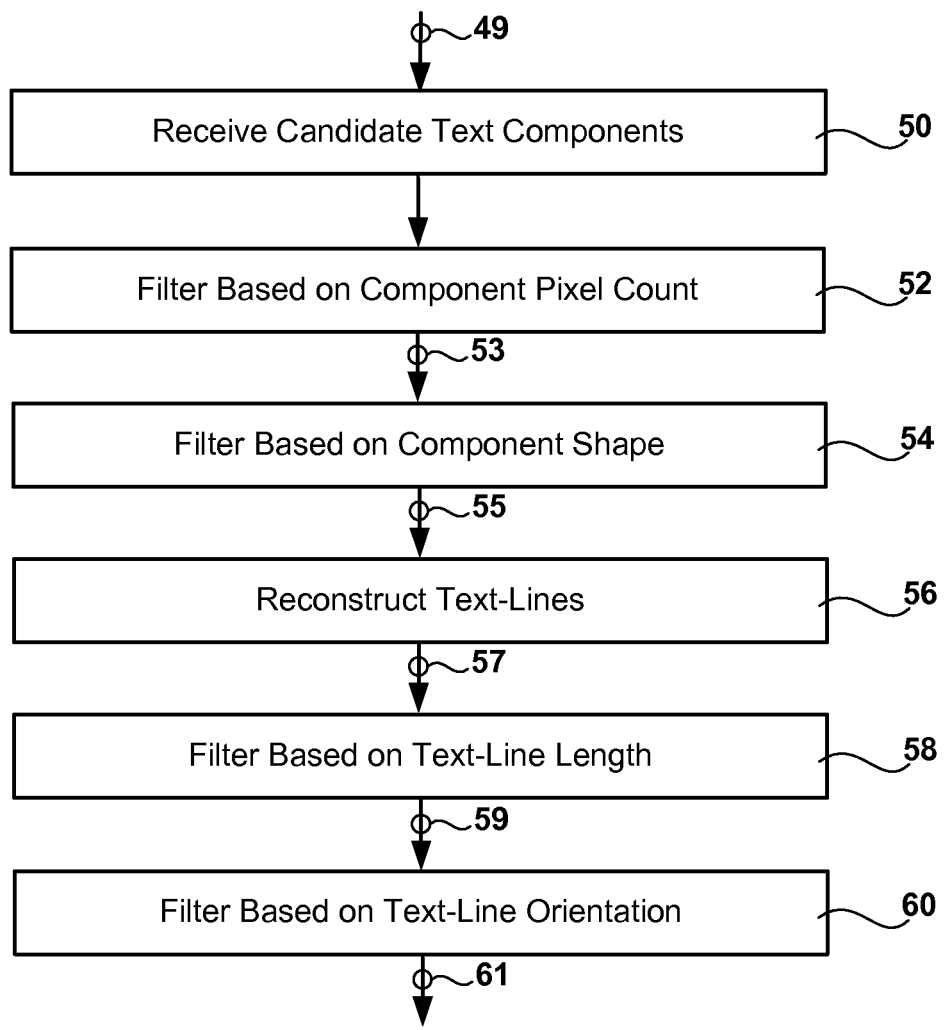
FIG. 5 is a chart showing exemplary embodiments of the present invention comprising multi-stage filtering, wherein candidate text components may be progressively refined.

Some embodiments of the present invention described in relation to FIG. 5 may comprise successive refinement of a set of candidate text components 49 associated with a digital image. The initial set 49 of candidate text components may be received 50, and a first refined set 53 of candidate components may obtained based on component-pixel-count filtering 52. An exemplary embodiment may comprise eliminating a candidate component when $C_{pcount}^i<\text{cnt\_min}$ or $C_{count}^i>\text{cnt\_max}$, where $C_{pcount}^i$ is the number of pixels comprising the ith candidate component and [cnt_min, cnt_max] is the range of pixel counts for which candidate components may be retained. In some embodiments of the present invention, the upper and lower bounds, cnt_max and cnt_min, respectively, may be heuristically or empirically established. In alternative embodiments of the present invention, these bounds may be dynamically determined and based on properties of the input image from which the initial set of candidate components may be determined. Exemplary input image properties may comprise, size, resolution and other image properties.

The first refined set 53 of candidate components may be further refined producing a second refined set 55 of candidate components based on component-shape-based filtering 54. In some embodiments of the present invention, filtering 54 based on component shape may comprise determining the values of several shape properties for a candidate component.

In some embodiments of the present invention, the component width may be determined, and the width of the ith component may be denoted $C_{width}^i$. In some embodiments of the present invention, the component height may be determined, and the height of the ith component may be denoted $C_{height}^i$. In some embodiments of the present invention, the aspect ratio associated with a component may be determined according to:

$$C_{AR}^i = \frac{\max(C_{width}^i, C_{height}^i)}{\min(C_{width}^i, C_{height}^i)},$$

where $C_{AR}^i$ denotes the aspect ratio of the ith component.

In some embodiments of the present invention, the component-shape-based filtering 54 may comprise labeling the ith component, $C^i$, as a text component or a non-text component according to:

$$\text{label}(C^i) = \begin{cases} \text{text}, & (Condition_{width} \mid Condition_{height}) \& (Condition_{AR}) \\ \text{non-text}, & \text{otherwise} \end{cases},$$

where $Condaton_{width}$, $Condition_{height}$ and $Condition_{AR}$ are conditions on the width, height and aspect ratio of the ith component, respectively, and & and I denote the logical "and" operations and the logical "or" operation, respectively. In some embodiments of the present invention, the three conditions $Condition_{width}$, $Condition_{height}$ and $Condition_{AR}$ may be found according to:

$$Condition_{width} = (C_{width}^i > T_{width}^{min}) \& (C_{width}^i < T_{width}^{max}),$$

$$Condition_{height} = (C_{height}^i > T_{height}^{min}) \& (C_{height}^i < T_{height}^{max})$$

and $$Condition_{AR} = (C_{AR}^i > T_{AR}^{min}) \& (C_{AR}^i < T_{AR}^{max}),$$

respectively, where $T_{width}^{min}$, $T_{width}^{max}$ are the upper and lower bounds on acceptable component widths, respectively, $T_{height}^{min}$, $T_{height}^{max}$ are the upper and lower bounds on acceptable component heights, respectively, and $T_{AR}^{min}$, $T_{AR}^{max}$ are the upper and lower bounds on acceptable component aspect ratios, respectively.

In alternative embodiments of the present invention, the component-shape-based filtering 54 may comprise labeling the ith component, $C^i$, as a text component or a non-text component according to:

$$\text{label}(C^i) = \begin{cases} \text{text}, & Condition_{width} \& Condition_{height} \& Condition_{AR} \\ \text{non-text}, & \text{otherwise} \end{cases},$$

where $Condaton_{width}$, $Condition_{height}$ and $Condition_{AR}$ are conditions on the width, height and aspect ratio of the ith component, respectively, and & denotes the logical "and" operation. In some embodiments of the present invention, the three conditions $Condition_{width}$, $Condition_{height}$ and $Condition_{AR}$ may be found according to:

$$Condition_{width} = (C_{width}^i > T_{width}^{min}) \& (C_{width}^i < T_{width}^{max}),$$

$$Condition_{height} = (C_{height}^i > T_{height}^{min}) \& (C_{height}^i < T_{height}^{max})$$

and $$Condition_{AR} = (C_{AR}^i > T_{AR}^{min}) \& (C_{AR}^i < T_{AR}^{max}),$$

respectively, where $T_{width}^{min}$, $T_{width}^{max}$ the upper and lower bounds on acceptable component widths, respectively, $T_{height}^{min}$, $T_{height}^{max}$ are the upper and lower bounds on acceptable component heights, respectively, and $T_{AR}^{min}$, $T_{AR}^{max}$ are the upper and lower bounds on acceptable component aspect ratios, respectively.

In some embodiments of the present invention, the thresholds, $T_{width}^{min}$, $T_{width}^{max}$, $T_{height}^{min}$, $T_{height}^{max}$, $T_{AR}^{min}$ and $T_{AR}^{max}$, may be heuristically or empirically established. In alternative embodiments of the present invention, these thresholds may be dynamically determined and based on properties of the input image from which the initial set of candidate components may be determined. Exemplary input image properties may comprise, size, resolution and other image properties. In an exemplary embodiment of the present invention, the width and height thresholds, $T_{width}^{min}$, $T_{width}^{max}$, $T_{height}^{min}$ and $T_{height}^{max}$, may be determined according to:

$$T_{width}^{min} = \lfloor \omega_1 \mu_{width} \rfloor,$$

$$T_{width}^{max} = \lceil \omega_2 \mu_{width} \rceil,$$

$$T_{height}^{min} = \lfloor \omega_3 \mu_{height} \rfloor$$

and $$T_{height}^{max} = \lceil \omega_4 \mu_{height} \rceil,$$

where $\lfloor \cdot \rfloor$ and $\lceil \cdot \rceil$ denote the "floor" and "ceiling" operations, respectively, and $\mu_{width}$ and $\mu_{height}$ denote the mean values of the widths and heights of the candidate components, respectively, and $\omega_j$, j=1, . . . , 4 denote weights used to compute the thresholds. In some embodiments of the present invention the weights may be selected according to:

$$\omega_1 \leq 1,$$

$$\omega_3 \leq 1,$$

$$\omega_2 \geq 1$$

and $$\omega_4 \geq 1.$$

In some embodiments of the present invention, the weights may be selected such that $\omega_1 = \omega_3$ and $\omega_2 = \omega_4$.

In alternative embodiments of the present invention, the width and height thresholds, $T_{width}^{min}$, $T_{width}^{max}$, $T_{height}^{min}$ and $T_{height}^{max}$, may be determined according to:

$$T_{width}^{min} = \lfloor \omega_1 \mu_{width} \rfloor,$$

$$T_{width}^{max} = \lceil \omega_2 \mu_{width} \rceil,$$

$$T_{height}^{min} = \lfloor \omega_3 \mu_{height} \rfloor$$

and $$T_{height}^{max} = \lceil \omega_4 \mu_{height} \rceil,$$

where $\mu_{width}$ and $\mu_{height}$ denote a statistical parameter with respect to the width and height of the candidate components, respectively. Exemplary statistical parameters may include a trimmed mean, media, mode and other statistical parameters.

Candidate components remaining 55 after component-shape-based filtering 54 may be combined 56 to form text lines. Text lines may be generated using any of the methods available in the art. An exemplary method is described in U.S. Pat. No. 5,949,906, entitled "Apparatus and method for extracting character string." Text line reconstruction 56 may yield K candidate text lines 57 which may be denoted $L_k$, k=1, . . . , K, and a candidate text line may comprise one or more candidate connected components which may be denoted $C_k^i$ where k indicates the candidate text line containing candidate component i.

In these embodiments of the present invention, some of the candidate components $C_k^i$ contained in text line $L_k$ 57 may be eliminated as text components based on text-line length filtering 58 according to:

$$\text{label}(C_k^i) = \begin{cases} \text{text,} & \text{length } (L_k) \geq T_{line\_length} \\ \text{non-text,} & \text{otherwise} \end{cases},$$

where length ($L_k$) is the number of components $C_k^i$ in text line $L_k$ and $T_{line\_length}$ is a fixed threshold. In some embodiments of the present invention $T_{line\_length}$ may be heuristically or empirically established. In alternative embodiments of the present invention, the threshold $T_{line\_length}$ may be dynamically determined and based on properties of the document language and/or line reconstruction technique. In some embodiments of the present invention, the value of $T_{line\_length}$ may be in the range of 8 to 12.

Text lines 59 retained by text-line-length-based filtering 58 may be further filtered 60 based on text-line orientation. In these embodiments, the orientation of a text line, $L_k$, may be determined and may be denoted $\theta_k$, where $\theta_k$ is the angle between the text line and the scanner axes. The orientation $\theta_k$ associated with text line $L_k$ may be adjusted for the skew angle inherent in the input image according to:

$$\theta_k' = \theta_k - \theta_{doc},$$

where $\theta_k'$ denotes the adjusted orientation angle and $\theta_{doc}$ denotes the document skew angle. In some embodiments of the present invention, the orientation angle associated with a text line may be determined by calculating the slope of the line through the centroid of the first component in the text line and the centroid of the last component in the text line. In some embodiments of the present invention, the method used for determining the text lines may provide an associated orientation for each text line.

In some embodiments of the present invention, a document image may be adjusted for skew prior to processing for text determination. In these embodiments, the skew angle may be given by $\theta_{doc}=0$.

An intermediate parameter may be determined which may map the adjusted text-line orientation angle $\theta_k'$ to a cardinal-direction-indication angle according to:

$$\theta_k'' = \begin{cases} \theta_k', & |\theta_k'| \leq 45° \\ 90° - \theta_k', & \text{otherwise} \end{cases},$$

where $\theta_k''$ may be close to 0° for text line orientations in either the vertical or horizontal cardinal directions. Thus, the candidate components $C_k^i$ contained in text line $L_k$ may be eliminated as text components according to:

$$\text{label}(C_k^i) = \begin{cases} \text{text,} & \theta_k'' \leq T_\theta \\ \text{non-text,} & \text{otherwise} \end{cases},$$

where $T_\theta$ is a predetermined threshold. In some embodiments of the present invention, $T_\theta$ may be set to 0° for strict enforcement of the orientation criterion. In alternative embodiments of the present invention, $T_\theta$ may be set to a non-zero value to compensate for errors in skew computation. The resulting 61 candidates retained as text components from the filtering 60 based on text-line orientation may be considered the final list of text components.

Embodiments of the present invention described in relation to FIG. 5 comprise progressive refinement of a set of candidate text components. Alternative embodiments of the present invention described in relation to FIG. 6 comprise parallel component-pixel-count-based filtering 72 and component-shape-based filtering 74 of an initial set 69 of initially received 70 text component candidates. The results 73, 75 of the component-pixel-count based filtering 72 and the component-shape-based filtering 74 may be combined 76 to form a refined candidate list 77 which may be used to reconstruct 78 text lines 79 which may be progressively filtered as described in the embodiments illustrated by FIG. 5. The candidate text lines 79 may be filtered 80 based on text-line length, thereby producing a refined set 81 of candidate text lines which may be filtered 82 based on text-line orientation thereby producing the final set 83 of candidate text components.

Embodiments of the present invention described in relation to FIG. 5 comprise progressive refinement of a set of candidate text components. Alternative embodiments of the present invention described in relation to FIG. 7 comprise component-pixel-count filtering 92 of a set of initially received 90 candidate text components 89. Candidate components 93 retained by the component-pixel-count filtering 92 may be then filtered 94 according to component shape, and the retained components 95 may be used to reconstruct 96 text lines. The reconstructed text lines 97 may be filtered in parallel according to text-line length 98 and text-line orientation 100, and the results 99, 100 may be combined 102 to generate the final 103 text components.

Figure 8:
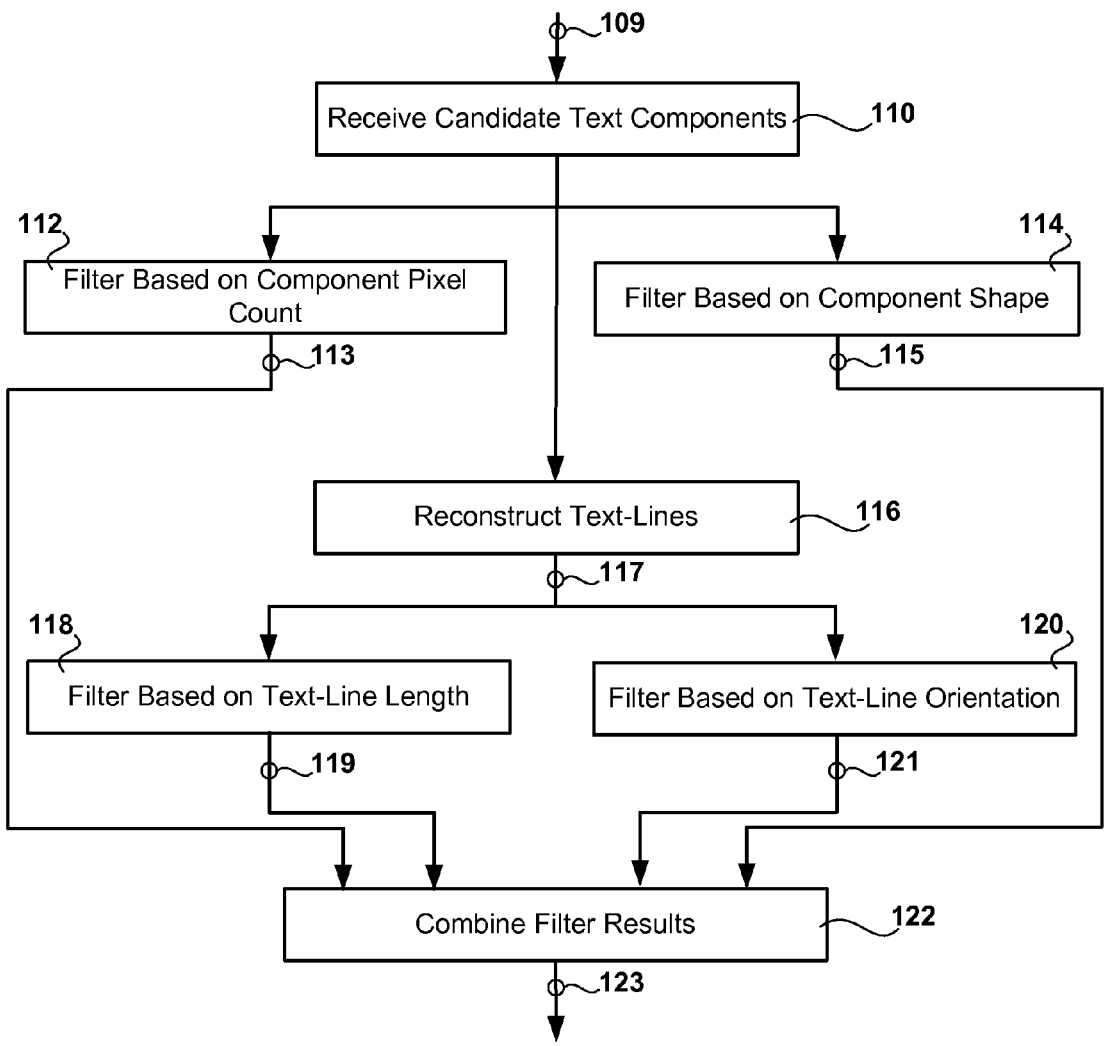
FIG. 8 is a chart showing exemplary embodiments of the present invention comprising parallel component-pixel-count-based filtering and component-shape-based filtering and text-line-length-based filtering and text-line-orientation-based filtering.

Alternative embodiments of the present invention described in relation to FIG. 8 may comprise parallel filtering of an initially received 110 set of candidate text components 109. The candidate text components 109 may be filtered 112 based on component pixel count, thereby producing a first set of filtered components 113. The candidate text components 109 may be filtered 114 based on component shape, thereby producing a second set of filtered components. The candidate text components 109 may be grouped 116 into text lines 117, and the text lines 117 may be filtered 118 based on text-line length, thereby producing a third set of filtered components 119. The text lines 117 may also be filtered 120 based on text-line orientation, thereby producing a fourth set of filtered components 121. The filtered components 113, 115, 119, 121 produced by the individual filtering stages 112, 114, 118, 120 may be combined 122 to form a final set 123 of text components.

Figure 6:
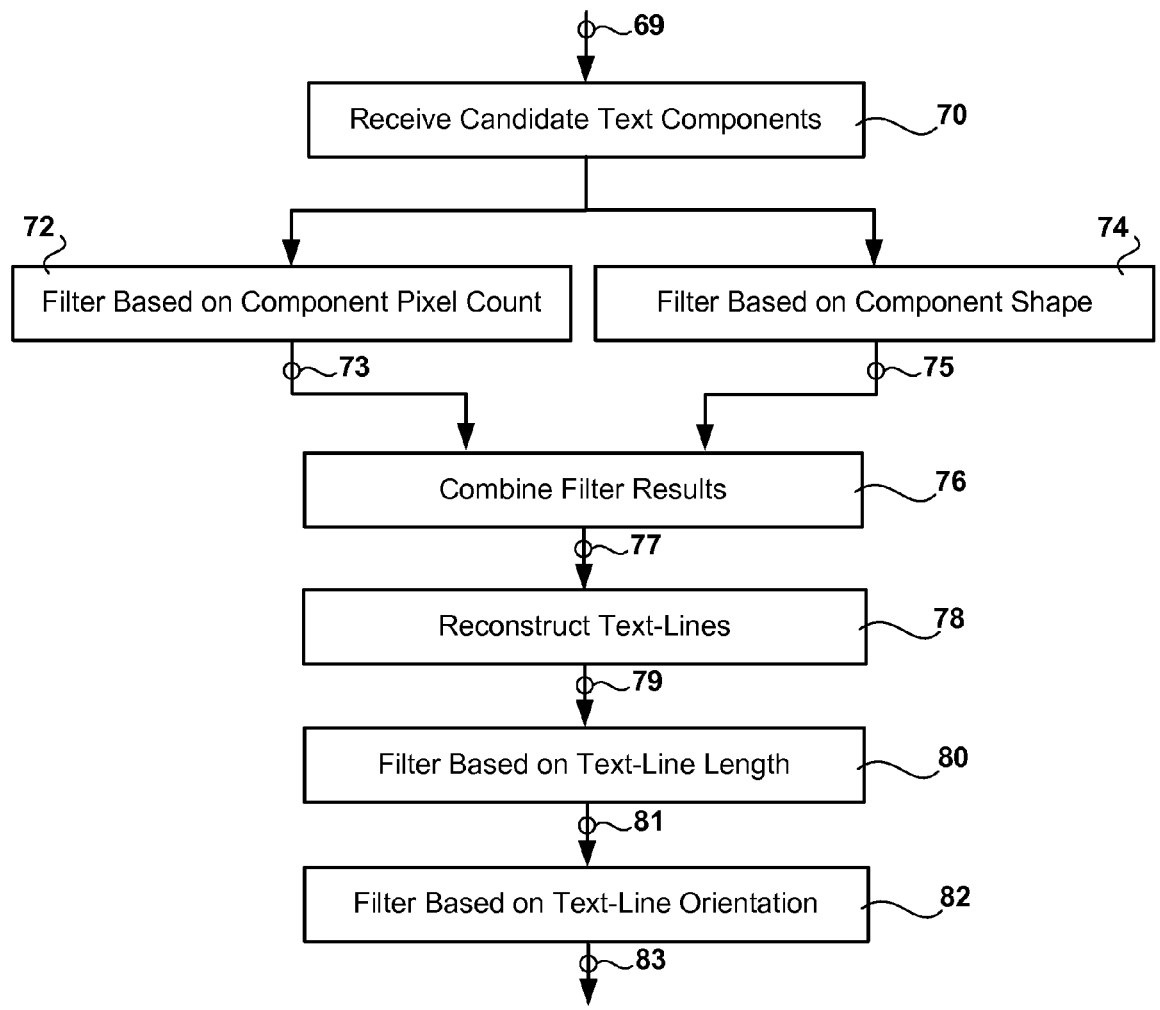
FIG. 6 is a chart showing exemplary embodiments of the present invention comprising parallel component-pixel-count-based filtering and component-shape-based filtering.
Figure 7:
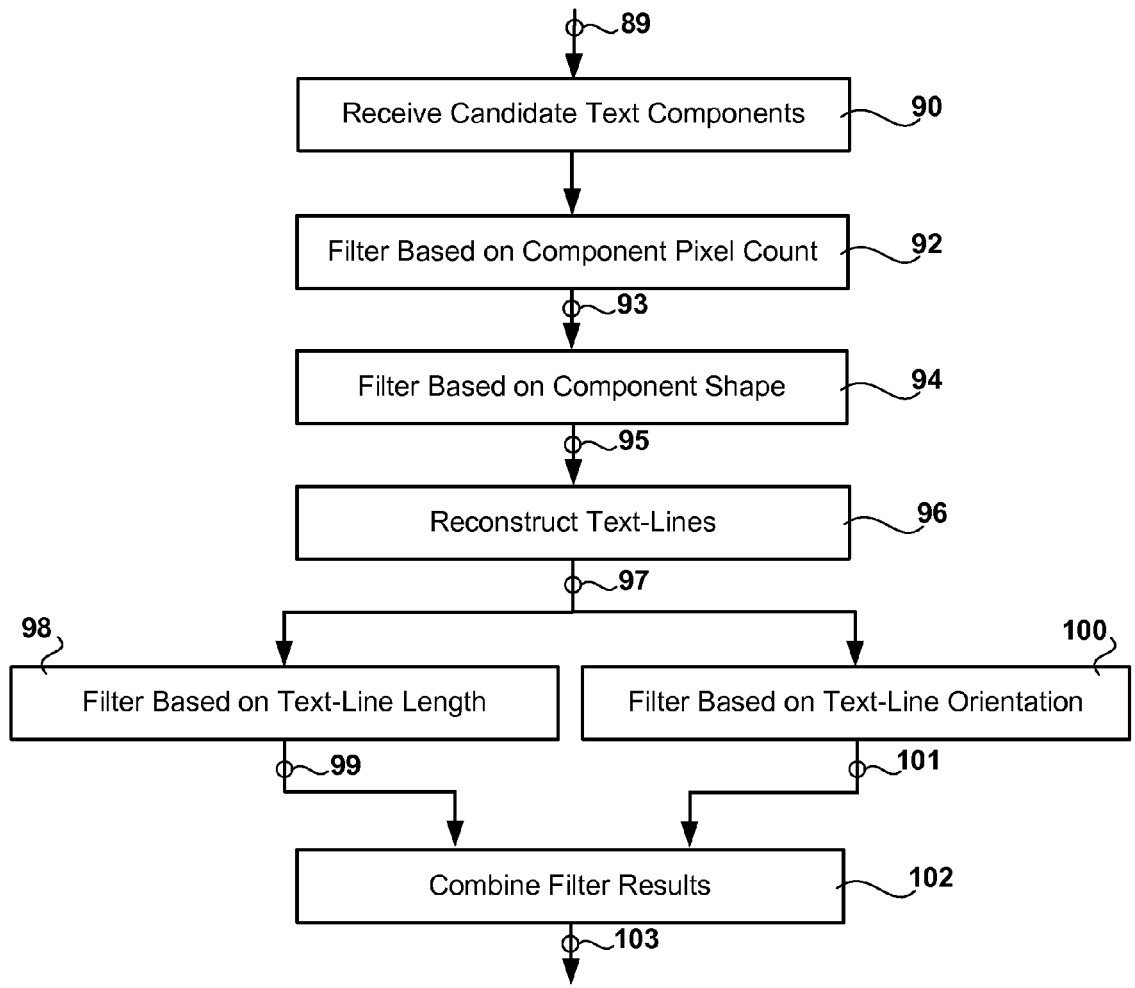
FIG. 7 is a chart showing exemplary embodiments of the present invention comprising parallel text-line-length-based filtering and text-line-orientation-based filtering.

In some of the embodiments described in relation to FIGS. 6-8, the output of parallel filters may be hard membership in the text and non-text classes, and the combination of these outputs may comprise logical combinations of the membership values. In alternative embodiments, the output of parallel filters may be a soft label associated with a membership value between 0 and 1, wherein a larger value denotes a stronger membership in the text class. The soft labels may be combined to form a hard, "text" or "non-text," label associated with a component.

Figure 9:
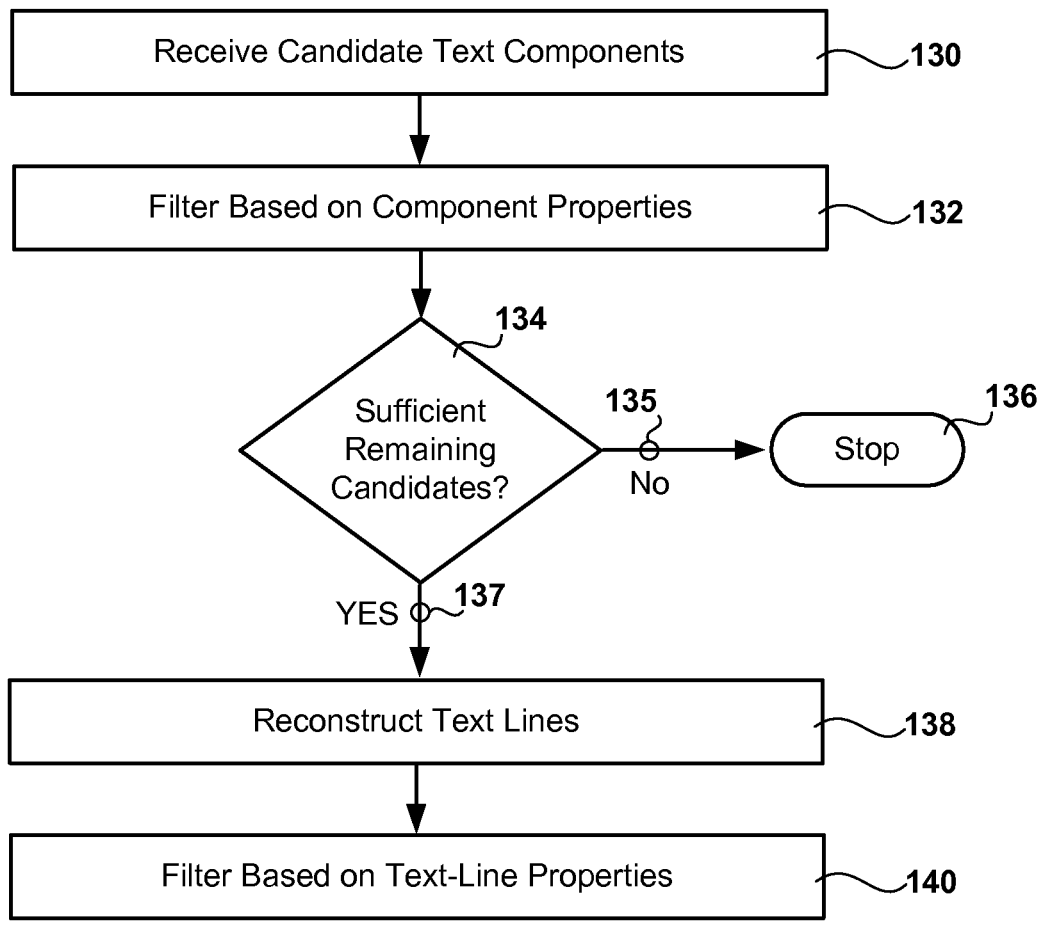
FIG. 9 is a chart showing exemplary embodiments of the present invention comprising text-line-properties-based filtering when a sufficient number of candidate components may remain after component-properties-based filtering.

In some embodiments of the present invention, subsequent candidate processing may be conditioned on the number of candidates remaining in the candidate pool. In exemplary embodiments described in relation to FIG. 9, an initial set of candidate components may be received 130 and filtered 132 based on component properties. The number of candidate components retained by the component-properties-based filtering 132 may be checked 134 to determine if a sufficient number of candidate components were retained. If it is determined 135 that an insufficient number of candidate components were retained for further processing, the processing may be halted 136. If it is determined 137 that a sufficient number of candidate components were retained for further processing, then text line reconstruction 138 may be performed on the retained candidate components, and text-line-property-based filtering 140 may be performed to generate the final text components.

Figure 10:
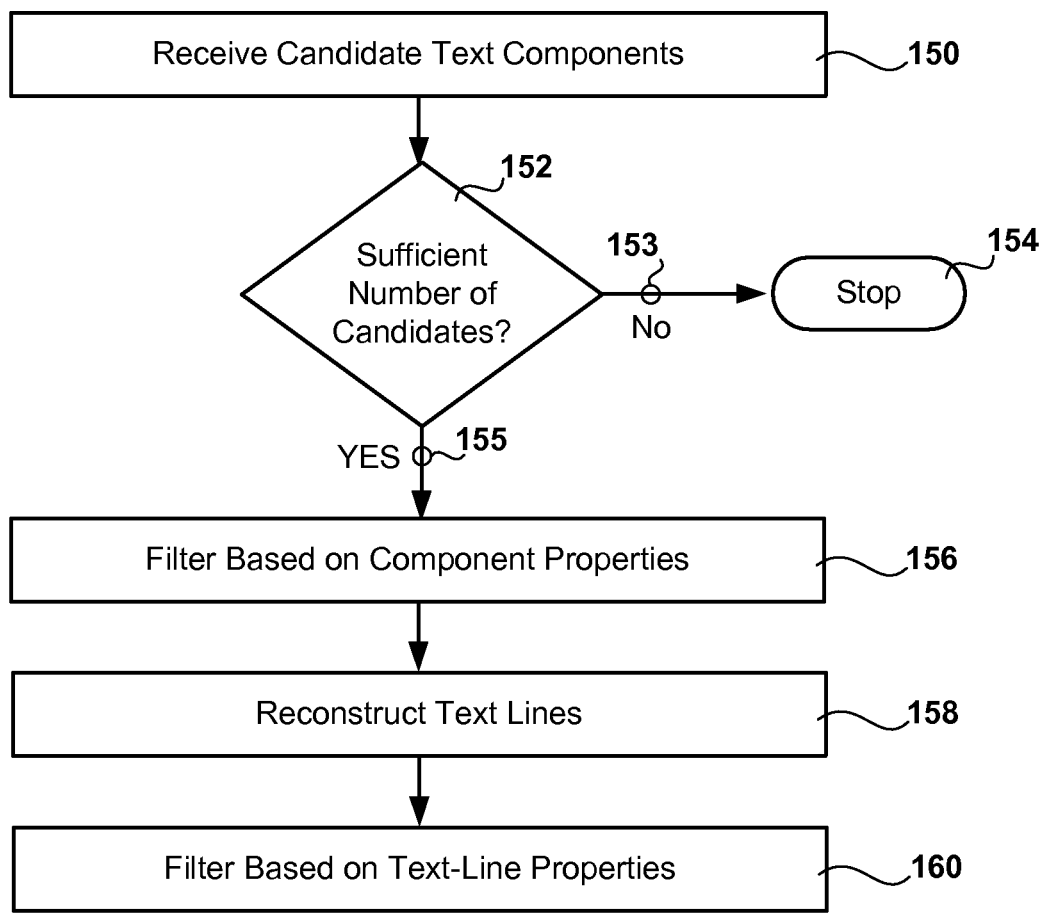
FIG. 10 is a chart showing exemplary embodiments of the present invention comprising restricting filtering when insufficient candidate components may be available.

In some embodiments of the present invention, candidate processing may be conditioned on the number of candidates initially in the candidate pool. In exemplary embodiments described in relation to FIG. 10, an initial set of candidate components may be received 150. The number of candidate components received may be checked 152 to determine if a sufficient number of candidate components are available for processing. If it is determined 153 that an insufficient number of candidate components are available for processing, the processing may be halted 154. If it is determined 155 that a sufficient number of candidate components are available for processing, then component-properties-based filtering 156 may be performed and followed by line reconstruction 158 on the retained candidate components. Text-line-property-based filtering 160 may be performed to generate the final text components.

Figure 11:
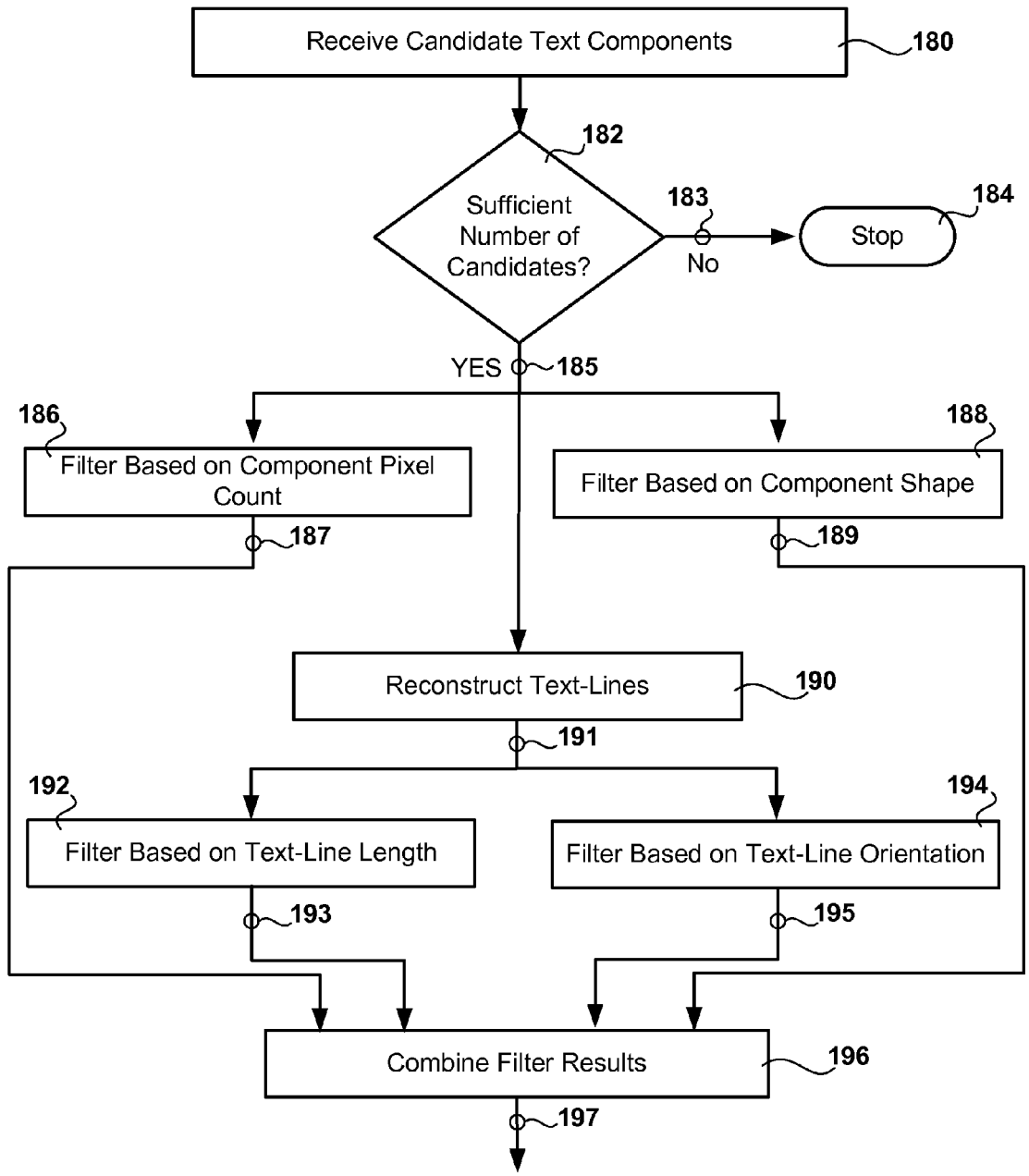
FIG. 11 is a chart showing exemplary embodiments of the present invention comprising restricting filtering when insufficient candidate components may be available.

In an alternative exemplary embodiment of the present invention described in relation to FIG. 11, an initial set of candidate components may be received 180. The number of candidate components received may be checked 182 to determine if a sufficient number of candidate components are available for parallel filtering. If it is determined 183 that an insufficient number of candidate components are available for processing, the processing may be halted 184. If it is determined 185 that a sufficient number of candidate components are available for filtering, then component-pixel-count filtering 186, component-shape-based filtering 188 and text-line reconstruction 190 be performed. Reconstructed text lines 191 may be filtered based on text-line length 192 and based on text-line orientation 194. The results 187, 189, 193, 195 of the four filters may be combined 196 to generate the final 197 text components.

In some of the embodiments described in relation to FIG. 11, the output of parallel filters may be hard membership in the text and non-text classes, and the combination of these outputs may comprise logical combinations of the membership values. In alternative embodiments, the output of parallel filters may be a soft label associated with a membership value between 0 and 1, wherein a larger value denotes a stronger membership in the text class. The soft labels may be combined to form a hard, "text" or "non-text," label associated with a component.

Figure 12:
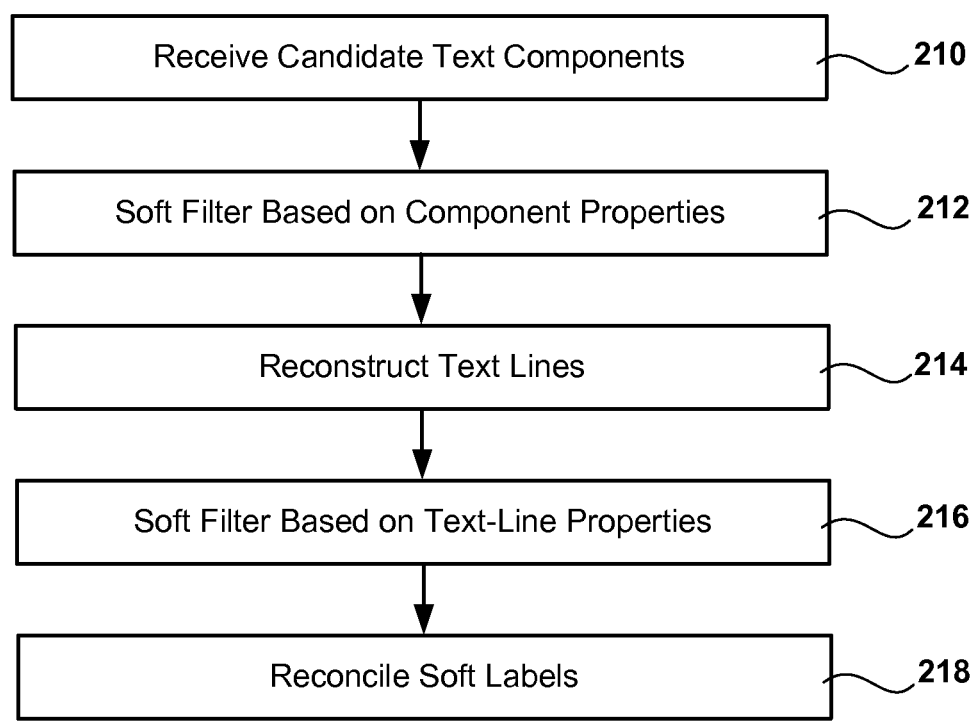
FIG. 12 is a chart showing exemplary embodiments of the present invention comprising filtering comprising soft membership value assignment.

Some embodiments of the present invention may be described in relation to FIG. 12. In these embodiments, a set of candidate text components may be received 210 and filtered 212 based on component properties. Each candidate component may be assigned a first soft label associated with a membership value between 0 and 1, wherein a larger value denotes a stronger membership in the text class, during the component-properties-based filtering 212. Candidate components with a soft label above a first threshold may be retained and used to construct 214 text lines. Each text line may be filtered 216 based on text-line properties and assigned a second soft label during the text-line-based filtering 216. The first soft label associated with a component and the second soft label associated with a component may be used to determine 218 the final component label.

Figure 13:
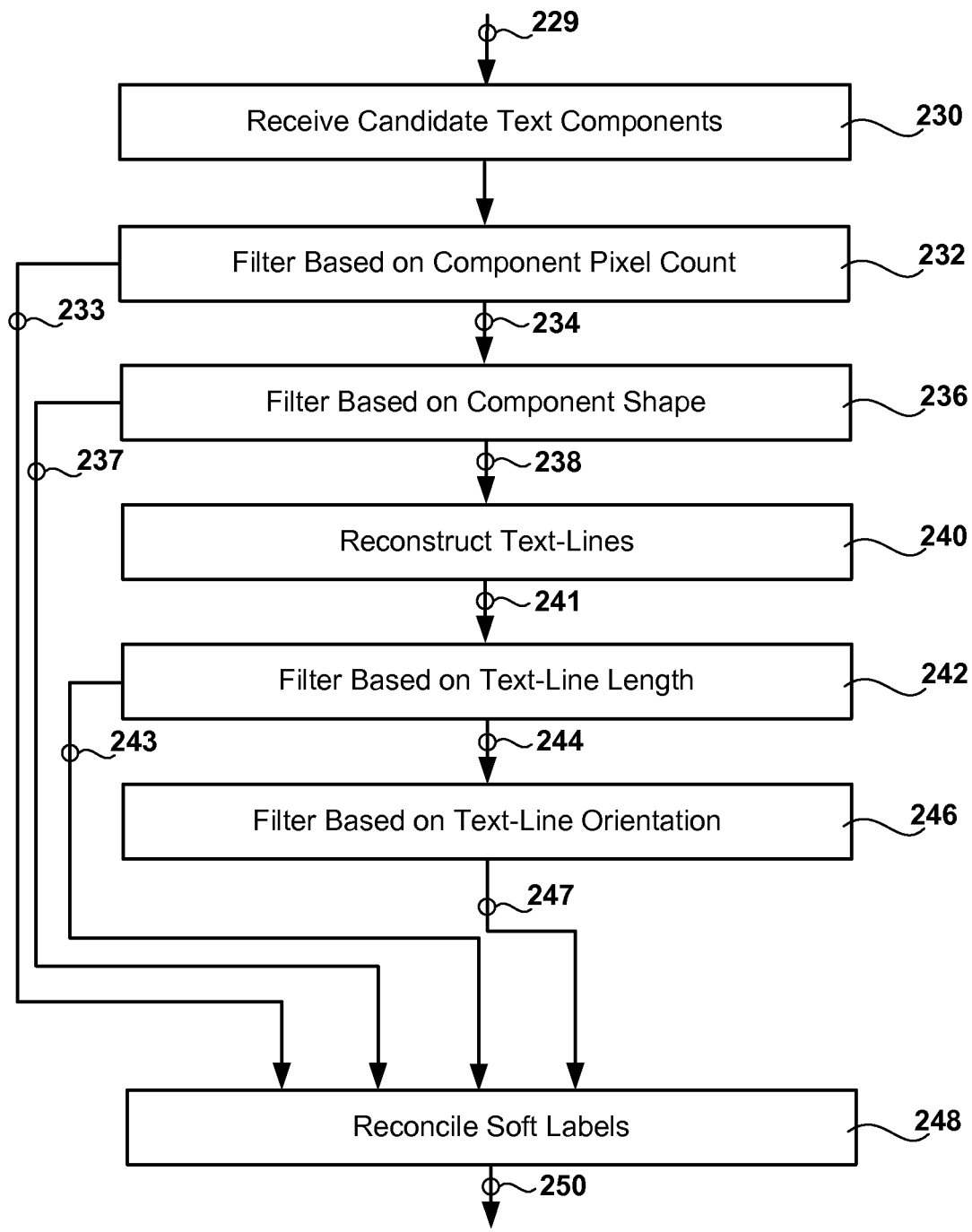
FIG. 13 is a chart showing exemplary embodiments of the present invention comprising soft membership value assignment.

Some embodiments of the present invention may be described in relation to FIG. 13. In these embodiments, an initial set of candidate components 229 maybe received 230 and filtered 232 based on component pixel count. A first soft label 233 may be assigned to each candidate component in the initial set of candidate components 229 based on the component-pixel-count-based filtering 232. Based on the first soft labels 233, a first set of candidate components 234 may be retained for additional filtering. In some embodiments of the present invention, the initial set of candidate components 229 may not be refined, but instead the entire initial set of candidate components may be retained. The retained candidate components 234 maybe filtered 236 based on component shape and assigned a second soft label 237. Based on the second soft labels 237, a second set of candidate components 238 may be retained for additional filtering. In some embodiments of the present invention, all candidate components may be retained for subsequent processing. The candidate components 238 retained for additional filtering may be used to reconstruct 240 text lines 241. The reconstructed text lines 241 may be filtered 242 based on text-line length and assigned a third soft label 243. In some embodiments of the present invention, the third soft label 243 assigned to a text line may be assigned to each component comprising the text line. Based on the third soft labels 243, a first set of text lines may be retained for additional filtering. In some embodiments of the present invention, all text lines may be retained for subsequent filtering. The retained text lines 244 may be filtered 246 based on text-line orientation and a fourth soft 247 label may be assigned to each text line and/or each component within a text line. The first 233, second 237, third 243 and fourth 247 soft labels may be reconciled 248 to generate the final text components 250.

In some embodiments of the present invention, the input image to which the initial component candidates correspond may be associated with an entire digital image. In alternative embodiments of the present invention, the input image to which the initial component candidates correspond may be a portion or region of a digital image. In some embodiments the portions may be related to strips or blocks of a fixed size. In alternative embodiments, the regions may be determined by a preprocessing model which may segment a digital image based on document properties.

Some embodiments of the present invention may be embodied as an embedded application that resides on an imaging device. Exemplary imaging devices may include scanners, copiers, printers, multi-function peripherals which may combine the functionality of multiple imaging devices and other imaging devices. Alternative embodiments of the present invention may be embodied as a server-based application associated with an imaging device. Still alternative embodiments of the present invention may be embodied as a client-based software application that runs on a personal computing device.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for locating text in a digital image, said method comprising:
   receiving a first plurality of candidate components;
   filtering said first plurality of candidate components based on component properties, thereby producing a second plurality of candidate components;
   forming a first plurality of text lines from said second plurality of candidate components;
   filtering said first plurality of text lines based on a first text-line property associated with text-line length, thereby producing a second plurality of text lines; and
   filtering said second plurality of text lines based on a second text-line property associated with text-line orientation to locate a plurality of text components associated with said digital image.

2. A method as described in claim 1 further comprising:
   comparing the number of candidate components in said second plurality of candidate components to a first threshold; and
   only forming said first plurality of text lines, filtering said first plurality of text lines and filtering said second plurality of text lines when said comparison meets a first criterion.

3. A method as described in claim 1 further comprising:
   comparing the number of candidate components in said first plurality of candidate components to a first threshold; and
   only filtering said first plurality of candidate components, forming said first plurality of text lines, filtering said first plurality of text lines and filtering said second plurality of text lines when said comparison meets a first criterion.

4. A method as described in claim 1, wherein said filtering said first plurality of candidate components based on component properties comprises:
   filtering said first plurality of candidate components based on a first component property, thereby producing a third plurality of candidate components; and
   filtering said third plurality of candidate components based on a second component property, thereby producing said second plurality of candidate components.

5. A method as described in claim 1, wherein said filtering said first plurality of candidate components based on component properties comprises:
   filtering said first plurality of candidate components based on a first component property, wherein said filtering said first plurality of candidate components based on a first component property associates a membership value with each candidate component in said first plurality of candidate components, thereby producing a first plurality of membership values;
   filtering said first plurality of candidate components based on a second component property, wherein said filtering said first plurality of candidate components based on a second component property associates a membership value with each candidate component in said first plurality of candidate components, thereby producing a second plurality of membership values; and
   combining said first plurality of membership values and said second plurality of membership values to produce said second plurality of candidate components.

6. A method as described in claim 5, wherein:
   said membership values in said first plurality of membership values are hard membership values; and
   said membership values in said second plurality of membership values are hard membership values.

7. A method as described in claim 1, wherein said digital image is a portion of a second digital image.

8. A method as described in claim 1, wherein said filtering said first plurality of candidate components based on component properties comprises filtering based on component pixel count and on a component shape-related property.

9. A method for locating text in a digital image, said method comprising:
   receiving a first plurality of candidate components;
   filtering said first plurality of candidate components based on component properties, thereby producing a second plurality of candidate components;
   forming a first plurality of text lines from said second plurality of candidate components;
   filtering said first plurality of text lines based on a first text-line property associated with text-line length, wherein said filtering said first plurality of text lines based on a first text-line property associates a membership value with each text line in said first plurality of text lines, thereby producing a first plurality of membership values;
   filtering said first plurality of text lines based on a second text-line property associated with text-line orientation, wherein said filtering said first plurality of text lines based on a second text-line property associates a membership value with each text line in said first plurality of text lines, thereby producing a second plurality of membership values; and
   combining said first plurality of membership values and said second plurality of membership values to locate said plurality of text components associated with said digital image.

10. A method as described in claim 9, wherein said filtering said first plurality of candidate components based on component properties comprises:
    filtering said first plurality of candidate components based on a first component property, wherein said filtering said first plurality of candidate components based on a first component property associates a membership value with each candidate component in said first plurality of candidate components, thereby producing a third plurality of membership values;
    filtering said first plurality of candidate components based on a second component property, wherein said filtering said first plurality of candidate components based on a second component property associates a membership value with each candidate component in said first plurality of candidate components, thereby producing a fourth plurality of membership values; and
    combining said third plurality of membership values and said fourth plurality of membership values to produce said second plurality of candidate components.

11. A method as described in claim 9, wherein:
    said membership values in said first plurality of membership values are hard membership values; and
    said membership values in said second plurality of membership values are hard membership values.

12. A method as described in claim 9, wherein said digital image is a portion of a second digital image.

13. A method for locating text in a digital image, said method comprising:

receiving a first candidate component associated with a digital image;

when component property values associated with said first candidate component meet a first criterion, wherein said first criterion is related to at least one feature selected from the group consisting of image size, image resolution, a statistical property of the widths of a plurality of candidate components and a statistical property of the heights of said plurality of candidate components:

associating a "text" label with said first candidate component;

forming a first text line comprising said first candidate component; and when text-line property values associated with said first text line meet a second criterion associating a "non-text" label with said first candidate component; and when said component property values associated with said first candidate component do not meet said first criterion, associated a "non-text" label with said first candidate component.

14. A method as described in claim 13, wherein said component property values associated with said first candidate component are associated with:

a first component property related to the number of pixels comprising said first candidate component; and a second component property related to the shape of said first candidate component.

15. A method as described in claim 14, wherein said second component property comprises:

a width measure of said first candidate component;

a height measure of said first candidate component; and an aspect ratio measure of said first candidate component.

16. A method as described in claim 13, wherein said text-line property values associated with said first text line are associated with:

a first text-line property related to text-line length; and a second text-line property related to text-line orientation.

17. A method for locating text in a digital image, said method comprising:

receiving a first candidate component associated with a digital image;

for said first candidate component, determining a first component property value associated with a first component property related to the number of pixels in said first candidate component;

for said first candidate component, determining a second component property value associated with a second component property related to the shape of said first candidate component;

forming a first text line comprising said first candidate component;

for said first text line, determining a first text-line property value associated with a first text-line property related to the length of said first text line;

for said first text line, determining a second text-line property value associated with a second text-line property related to the orientation of said first text line;

associating said first candidate component with text image content in said digital image when said first component property value, said second component property value, said first-text line property value and said second text-line property value meet a first criterion; and associating said first candidate component with non-text image content in said digital image when said first component property value, said second component property value, said first-text line property value and said second text-line property value do not meet said first criterion.

18. A method as described in claim 17, wherein said digital image is a portion of a second digital image.

19. A method as described in claim 17, wherein said second component property comprises:

a width measure of said first candidate component;

a height measure of said first candidate component; and an aspect ratio measure of said first candidate component.

20. A system for locating text in a digital image, said system comprising, in an imaging device:

a candidate receiver for receiving a first plurality of candidate components;

a component-properties-based filter for filtering said first plurality of candidate components based on component properties, thereby producing a second plurality of candidate components;

a text line generator for forming a first plurality of text lines from said second plurality of candidate components;

a first text-line-properties-based filter for filtering said first plurality of text lines based on a first text-line property associated with text-line length, thereby producing a second plurality of text lines; and a second text-line-properties-based filter for filtering said second plurality of text lines based on a second text-line property associated with text-line orientation to locate a plurality of text components associated with said digital image.

* * * * *